United States Patent [19]
Chiang et al.

[11] Patent Number: 6,124,951
[45] Date of Patent: Sep. 26, 2000

[54] SCANNER UPPER HOUSING

[75] Inventors: Te-Ming Chiang; Ming-Sho Hsu, both of Taipei Hsien, Taiwan

[73] Assignee: Primax Electronics Ltd., Taipei Hsien, Taiwan

[21] Appl. No.: 09/080,146

[22] Filed: May 18, 1998

[51] Int. Cl.[7] .............................. H04N 1/00; H04N 1/04
[52] U.S. Cl. ..................... 358/474; 358/400; 399/379
[58] Field of Search ..................... 358/400, 401, 358/474, 497, 494, 471; 250/239, 208.1, 235, 234, 236; 355/75, 131, 102; 399/379, 380

[56] References Cited

U.S. PATENT DOCUMENTS

| | | | |
|---|---|---|---|
| 5,521,681 | 5/1996 | Nimura et al. | ............................. 355/75 |
| 5,900,622 | 5/1999 | Ogura et al. . | |

*Primary Examiner*—Cheukfan Lee
*Attorney, Agent, or Firm*—Bacon & Thomas, PLLC

[57] ABSTRACT

The upper housing of a flatbed scanner is provided with a plurality of integrally formed block members for locating a transparent platform on which an object to be scanned is placed. Each block member includes a horizontal block piece and a vertical block piece protruding from the horizontal block piece. The horizontal block piece is a protruding portion extending perpendicular to an internal surface of the upper housing for restricting horizontal movement of the transparent platform and the vertical block piece has a vertical retaining section having an inclined surface which flexes in the horizontal direction as the transparent platform is pushed past the vertical block piece, the vertical retaining section then recovering to vertically secure the transparent platform on the internal surface. The transparent platform can be mounted over the upper housing with no need to use adhesive tape.

3 Claims, 2 Drawing Sheets

SCANNER UPPER HOUSING

BACKGROUND OF THE INVENTION

1. Field of the Invention

The present invention relates to an improvement of a flatbed scanner's upper housing, and particularly, to an improved scanner upper housing which utilizes an integrally formed block member to locate a transparent platform over the upper housing.

2. Description of the Prior Art

A flatbed scanner generally includes a transparent platform for placing thereon an object to be scanned, and such transparent platform is usually located over an upper housing of the scanner. A traditional method for locating the transparent platform is to firstly label special adhesive tapes over each edge of the transparent platform, then adhere the same over the upper housing.

However, the above method would generate the following drawbacks:

(a) The adherence of the tape would decline depending on the temperature and moisture so as to decrease the adherent effect. The transparent platform may detach from the upper housing when conducting a UL drop test.

(b) The transparent platform would be very difficult to be dis-assembled for further handling after it is firmly adhered over the upper housing.

SUMMARY OF THE INVENTION

It is therefore a primary objective of the present, invention to provide an improved flatbed scanner's upper housing which utilizes an integrally formed block member to locate a transparent platform over the upper housing, thereby eliminating the inconvenience in using adhesive tapes.

Briefly, the improved scanner upper housing according to the present invention comprises:

an integrally formed housing including a plurality of side walls and an internal surface having a concave portion; and a plurality of block members provided on at least one rim of the internal surface adjacent to the concave portion for mounting the transparent platform over the internal surface.

In accordance with one aspect of the present invention, each block member includes a horizontal block piece and a vertical block piece protruding from the horizontal block piece, in which the horizontal block piece is a protruding portion perpendicular to the internal surface for restricting horizontal movement of the transparent platform and the vertical block piece has an inclined surface and is flexible toward the horizontal direction to permit the transparent platform to be pushed past the block member, thereby retaining the internal surface. Furthermore, at least one L-shaped piece element is provided on another rim of the internal surface adjacent to the concave portion for locating the transparent platform -over the internal surface.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
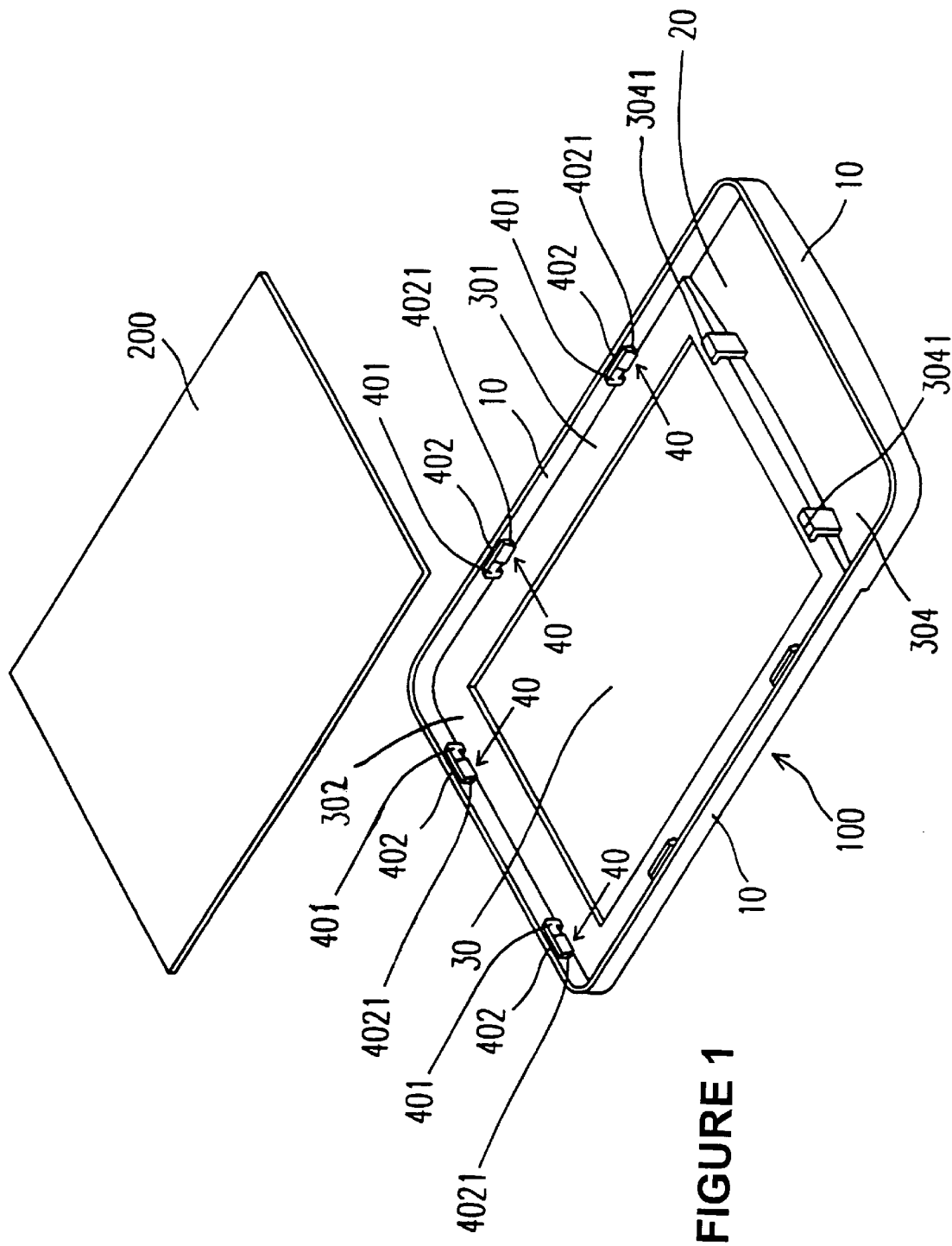
FIG. 1 illustrates a first perspective view of an upper housing according to the present invention.
Figure 2:
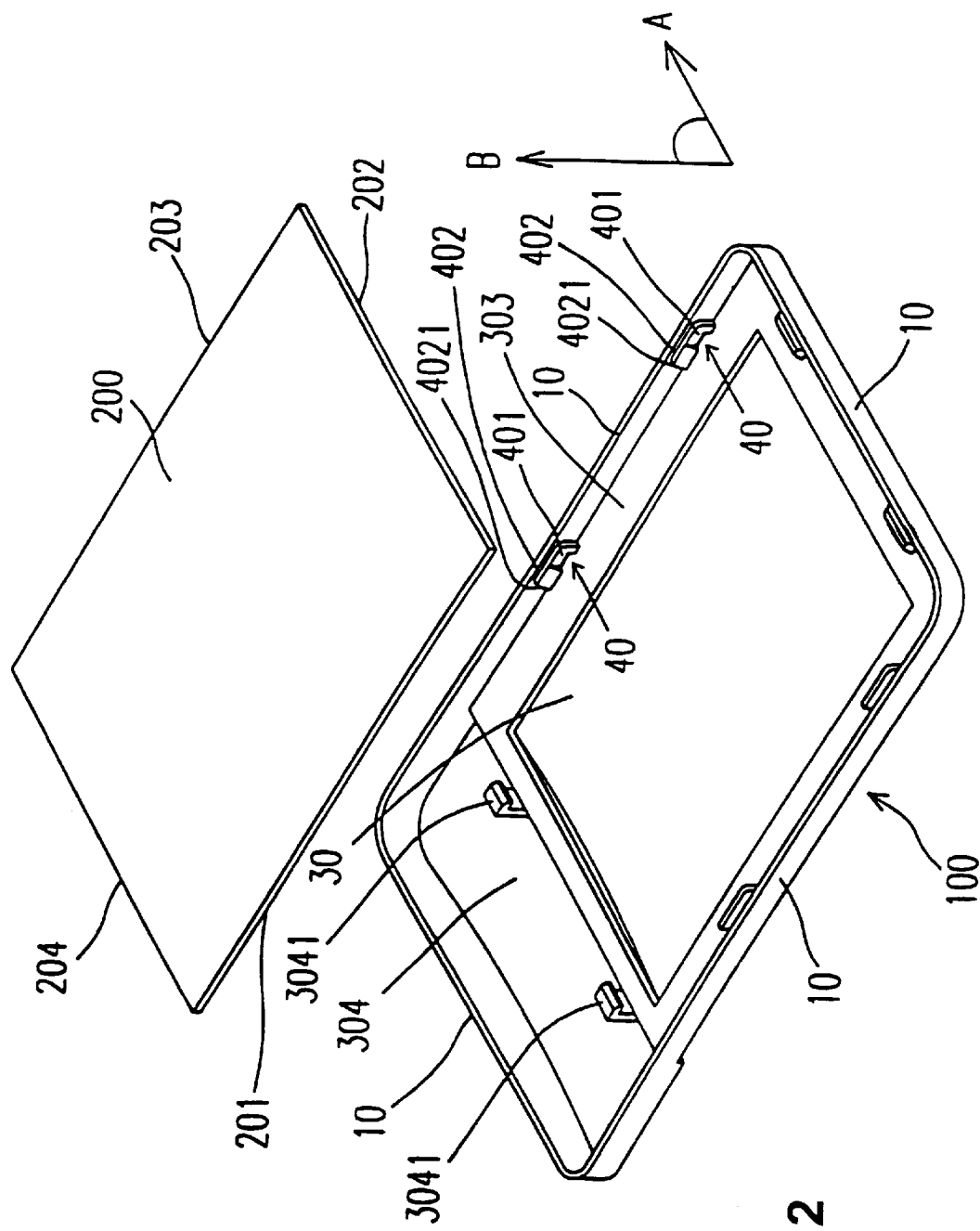
FIG. 2 shows a second perspective view of the upper housing according to the present invention.

Please refer to FIGS. 1 and 2 which illustrate first and second perspective views, respectively, of an upper housing according to the present invention. The preferred upper housing includes an integrally formed rectangular frame 100 which has four side walls 10 and an internal surface 20 having a concave portion 30 and four rims 301, 302, 303 and 304. A plurality of block members 40 are provided on at least one rim 301 adjacent to the concave portion 30 for locating a transparent platform 200 over the internal surface 20.

The block member 40 includes a horizontal block piece 401 and a vertical block piece 402 protruding from the horizontal block piece 401. In this preferred embodiment, the horizontal block piece 401 is a protruding portion perpendicular to the internal surface for restricting horizontal movement (along direction A) of the transparent platform 200 and the vertical block piece 402 is used for restricting vertical movement (along direction B) and has an inclined surface 4021 which is flexible in a horizontal direction to permit the transparent platform to be pushed past the block member, the vertical block piece then retaining the transparent platform 200 on the internal surface 20. At least one L-shaped piece element 3041 is provided on another rim 304 of the internal surface 20 adjacent to the concave portion 30 for locating the transparent platform 200 over the internal surface 20.

Referring to FIG. 2, the transparent platform 200 can be located over the upper housing 100 by inserting one edge 204 of the transparent platform 200 beneath the L-shaped piece element 3041, then vertically pushing the rest of the three edges 201, 202 and 203 downward along the slant 4021 of the vertical block piece 402. Since the vertical block piece 402 is flexible in horizontal direction, it will recover to its original position after the transparent platform 200 is pressed down over the internal surface 20. Conversely ,the transparent platform 200 can be disinstalled by pushing the vertical block piece 402 toward the horizontal direction so that the transparent platform 200 can be released from the restriction of the vertical block piece 402.

Because the block members 40 are integrally formed on the upper housing 100, no additional instrument such as adhesive tape and tools are needed for installing the transparent platform 200 over the upper housing 100 of the flatbed scanner.

The above disclosure is not intended as limiting. Those skilled in the art will readily observe that numerous modifications and alterations of the system may be made while retaining the teachings of the invention. Accordingly the above disclosure should be construed as limited only by the metes and bounds of the appended claims.

What is claimed is:

1. A flatbed scanner upper housing arrangement for locating thereon a transparent platform on which an object to be scanned is to be placed, comprising:

an integrally formed housing including a plurality of side walls and an internal surface having a concave portion and a plurality of rims; and at least one block member provided on at least one rim of said internal surface adjacent to said concave portion for locating said transparent platform over said internal surface, said at least one block member including a vertical retaining section arranged to flex in a horizontal direction as said transparent platform is pushed past the block member onto said internal surface, and to recover following movement of said transparent platform past the block member to retain the transparent platform on the internal surface.

2. The upper housing of claim 1 wherein said block member includes a horizontal block piece, said horizontal block piece including a protruding portion extending perpendicular to said internal surface for restricting horizontal movement of said transparent platform, said vertical retaining section including a vertical block piece protruding from said horizontal block piece, said vertical block piece including an inclined surface.

3. The upper housing of claim 2, further comprising at least one L-shaped piece element located on another rim of said internal surface adjacent to said concave portion for locating said transparent platform over said internal surface.

* * * * *